United States Patent

[11] 3,612,553

[72] Inventor George J. Ovanin
 Euclid, Ohio
[21] Appl. No. 803,204
[22] Filed Feb. 28, 1969
[45] Patented Oct. 12, 1971
[73] Assignee The S-P Manufacturing Corporation

[54] LOW PROFILE FLUID ACTUATED CHUCK
 11 Claims, 4 Drawing Figs.
[52] U.S. Cl. .................................................. 279/4,
 92/52, 279/119
[51] Int. Cl. ....................................................... B23b 31/30
[50] Field of Search ............................................ 279/4, 117,
 119, 120; 269/32, 34; 92/52, 66

[56] References Cited
 UNITED STATES PATENTS
| | | | |
|---|---|---|---|
| 2,695,176 | 11/1954 | Work ........................... | 279/4 |
| 2,814,496 | 11/1957 | Damijonaitis ................ | 279/119 X |
| 3,142,491 | 7/1964 | Ohashi ......................... | 279/4 |
| 3,468,551 | 9/1969 | Sampson ...................... | 279/119 X |

*Primary Examiner*—Andrew R. Juhasz
*Attorney*—Watts, Hoffmann, Fisher & Heinke

ABSTRACT: A chuck having a low profile, particularly suitable for use with drill presses or the like. An internal fluid motor with a fixed piston and a movable cylinder is operably connected to jaw operating linkages within the chuck which are located radially about the fluid motor.

INVENTOR.
GEORGE J. OVANIN
BY Watts, Hoffmann,
Fisher & Heinke
ATTORNEYS

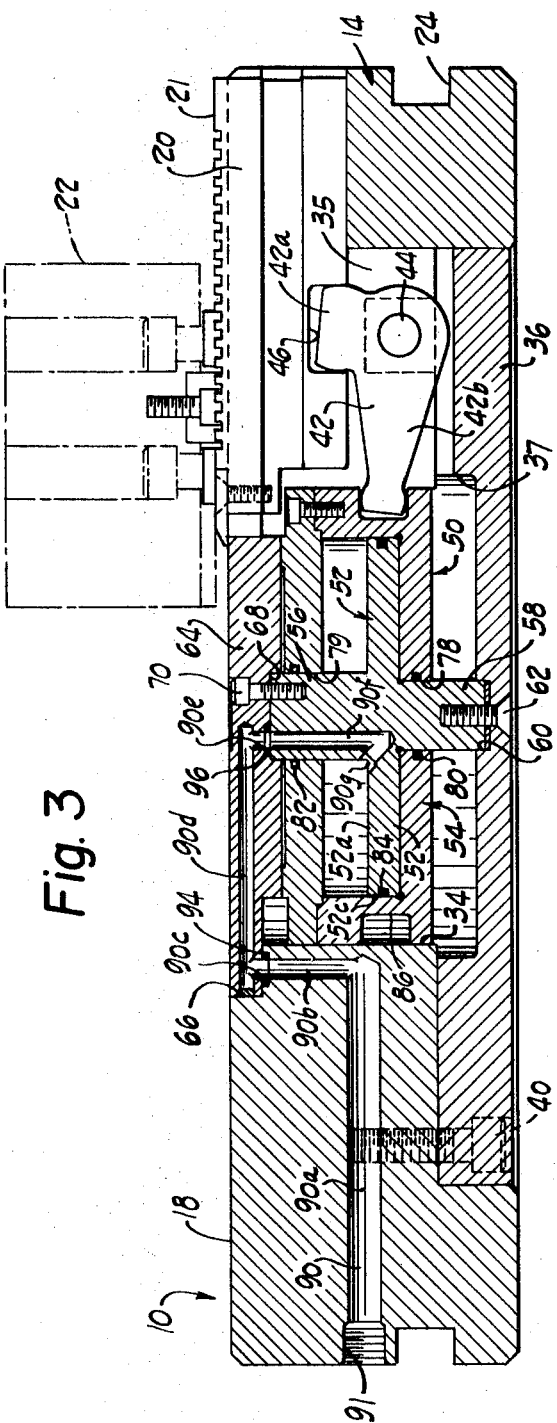

LOW PROFILE FLUID ACTUATED CHUCK

This invention relates to chucks and more particularly to a low profile or compact chuck especially suitable for use with a drill press or the like.

In the machining of metal parts it is customary to grip the metal workpiece in a work holder such as a chuck. Chucks are particularly advantageous in reducing the setup time required to position workpieces, as compared to that required by individual workpiece clamps or holddowns. On the other hand, chucks are typically large, and size limitations in certain machine tools, such as vertical drill presses, for example, due to space restrictions between the drill spindle and the bed or table on which the workpiece rests, have limited the use of chucks in such applications. Moreover, the typical chuck suitable for use on a lathe or the like is actuated from the rear and requires a special chuck actuator for use on a drill press table. This further reduces the available clearance between the spindle and the chuck, thereby reducing the height of the workpiece that can be accommodated. In addition, the expense involved in providing a compliment of chuck actuators in addition to the chucks is substantial.

The present invention provides the convenience and speed typical of chucks in properly locating and gripping workpieces, yet reduces the height of a chuck sufficiently to provide substantially the same workpiece capacity on a drill press table or the like as conventional clamping techniques.

A chuck embodying the present invention has a plurality of chuck jaws actuated by a double acting fluid motor contained entirely within a central cavity of the chuck body. The motor includes a piston fixed within the central cavity and a cylinder movable relative to the piston and chuck body, between the front or top of the chuck body, from which the master jaws of the chuck extend, and the back or bottom thereof. The chuck jaws are moved radially relative to a reference axis, typically the central axis of the chuck body by associated levers pivoted within the chuck and located radially outward from the central cavity. Arm portions of the levers extend into the central cavity and are moved by axial movement of the cylinder within the chuck to rock the levers and actuate the master jaws. The central cavity is of relatively large diameter, as are the cylinder and piston. As a result, substantial actuating force can be applied by the fluid motor to the jaw operating levers. Supply and exhaust conduits communicate from ports in the side of the chuck body to opposite axial sides of the piston within the cylinder, permitting the lower surface of the chuck to be mounted directly upon a drill press table or the like. To assure minimum axial height of the chuck, the axial extent of the fluid chamber of the cylinder at any operating position is maintained substantially within the axial space limits otherwise required by the master jaws of the chuck and the actuating lever arms. Thus, the actuating motor itself adds little or no additional height or axial distance to the overall chuck dimension, resulting in an extremely compact or low profile chuck.

In a preferred construction of the invention, the piston is supported in fixed position by rodlike projections extending from each opposite side of a central piston. One of said projections abuts against the backplate of the chuck body and the other abuts against a front cover plate that closes the central cavity at the face of the chuck. This piston construction assures substantial rigidity of the cover plate, against which a workpiece may be abutted when gripped by the chuck jaws and which in part receives the axial force applied to the workpiece by the cutting tool.

One embodiment of a chuck of the present invention includes four chuck jaws, three of which are displaced 120° from one another, and a fourth of which is placed opposite one of the other three. By removing the fourth work gripping jaw, the three jaws can be used to grip circular workpieces. By using only the two opposite work gripping jaws and removing the other two work gripping jaws, square or rectangular workpieces can be gripped.

These and other features and advantages of this invention will become more apparent as the invention becomes better understood from the following detailed description, when taken in connection with the accompanying drawings, in which:

FIG. 1 is a side elevational view of a chuck embodying the present invention, illustrated on a drill press table or the like;

Figure 2:
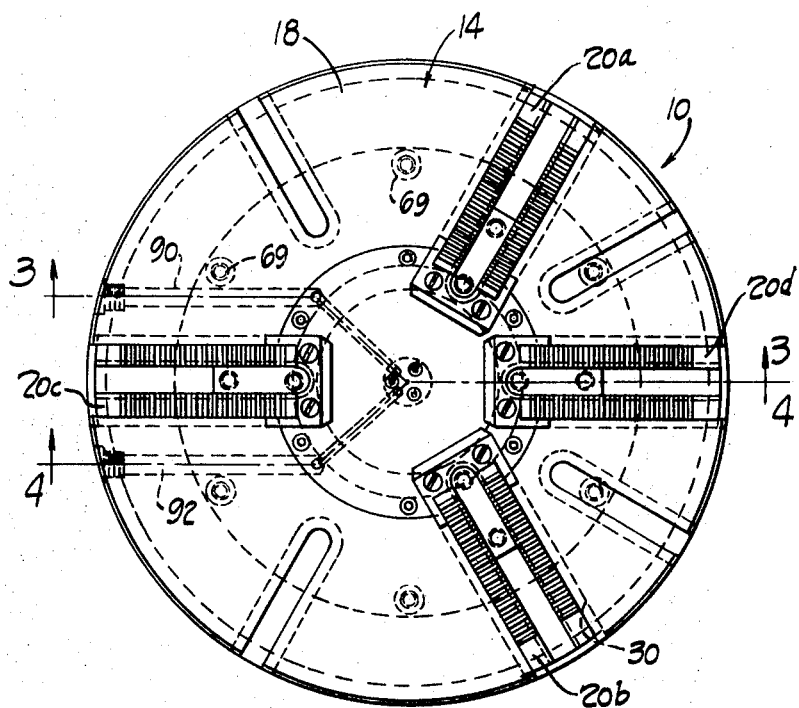
FIG. 2 is a top plan view of the front face of the chuck of FIG. 1.

FIG. 3 is a transverse sectional view taken along the line 3—3 of FIG. 2 and looking in the direction of the arrows, showing the actuating cylinder moved to the front or top of the chuck to open the chuck jaws; and FIG. 4 is a transverse sectional view taken along the line 4—4 of FIG. 2 and looking in the direction of the arrows, showing the actuating cylinder moved to the rear of the chuck to exert a closing force on the radially movable jaws.

Figure 1:
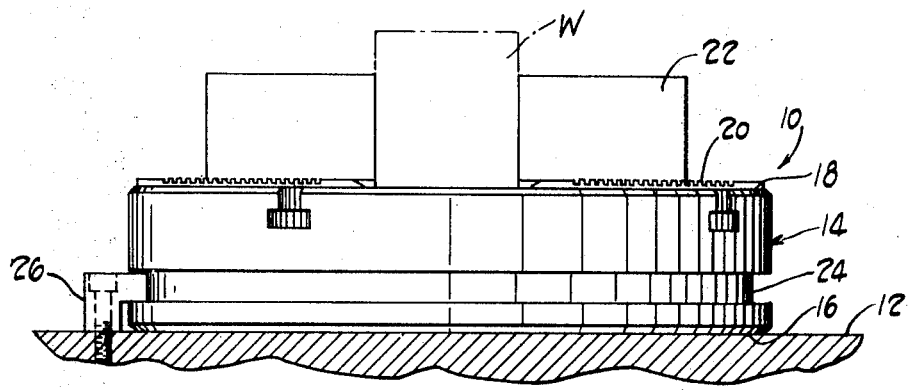

Referring now to the drawings, a chuck 10 of generally cylindrical configuration is shown, embodying the present invention. The chuck 10 is supported on a drill press table 12 in FIG. 1 and, from the proportions shown, it will be seen that the chuck has a relatively low profile; that is, it is short in axial length. The chuck has a generally cylindrical body portion 14 and, in use, rests on a lower surface 16, while a front surface 18 faces upward from the supporting table. A plurality of master jaws 20 with outer surfaces 21 extend from the front surface 18, radially disposed relative to a central axis of the cylindrical body portion, and serve to support work gripping jaws 22, shown in FIG. 1 with a workpiece W, and indicated in phantom in FIGS. 3 and 4, which are secured thereto. A peripheral groove 24 encircles the cylindrical body portion 14 to receive spaced holddown clamps, one of which is shown at 26, to secure the chuck to the drill press table.

In the embodiment shown, the chuck has four radial jaws 20a, b, c, d in slideways 30 that open through the front surface 18. As best shown in FIG. 2, the chuck jaws 20 converge toward the central axis of the chuck body. Three of the chuck jaws 20a, b, c are displaced 120 angular degrees from each other about the central axis. A fourth jaw 20d is located between the chuck jaws 20a and 20b, diametrically opposite from the jaw 20c.

A central passage 34 extends axially through the chuck body, centrally of the chuck jaws and communicates with the radial slideways 30. Four radially extending cavities or openings 35 are formed in the chuck body behind the slideways and master jaws, and also in communication with the central passage 34. The passage 34 extends through the chuck, and is closed at the back of the chuck body by a recessed backplate 36, secured to the chuck body by a plurality of cap screws 40. The backplate 36 has an inwardly facing circular recess 37 aligned with the passage 34 and of slightly larger diameter, which serves to maximize the depth of the passage while maintaining the height of the chuck body as small as possible.

An operating lever arm 42 is located within each radially extending cavity 35 and is pivotally mounted upon a lever pin 44 carried by the chuck body and extending across the respective cavity 35. Each operating lever arm 42 is in the form of a bell crank lever, and has a relatively short arm 42a and a longer arm 42b. The shorter arm 42a is engaged in a slot 46 in the back of the associated master chuck jaw 20. The extending end of the longer arm 42b of the operating lever extends into the central passage 34.

A fluid motor 50 is located in the central passage 34 of the chuck body, for operating the lever arms 42. The fluid motor includes a fixed piston 52 and a movable cylinder 54. The piston 52 has annular working surfaces 52a, 52b, is relatively thin axially of the chuck body, and is located intermediate the ends of the passage 34. It is supported by integral piston rod portions 56, 58 projecting in opposite directions from the piston, the portion 56 extending toward the front of the chuck body and the portion 58 extending rearwardly. Both piston rod portions are generally cylindrical, and the rearwardly extending portion 58 is closely received in a central recess 60 in the larger recessed portion 37 of the backplate 36, abuts against a spacer 61 and is secured by a screw 62. A cover plate 64 is located within a recess 66 in the front face 18 of the chuck, flush with the front face, and closes the passage 34 at the front of the chuck body. An inwardly facing central recess 68 in the cover plate 64 receives the end of the piston rod portion 56 of the piston 52. The cover plate 64 is secured in place by capscrews 69 about the periphery of the plate (FIG. 2) and is secured to the end of the piston rod portion 56 by capscrews 70.

The movable cylinder 54 is of shorter axial length than the distance between the base of the recessed part 37 of the backplate 36 and the inside surface of the cover plate 64 and is of two-piece construction, one piece 72 comprising an integral end plate 72a and a cylindrical sidewall 72b. The second piece is a separate end wall 74, secured to the sidewall 72b by spaced capscrews 76. A central aperture 78 in the end wall 72 slidably receives the rearward extending piston rod portion 58, and an aperture 79 in the separate end wall 74 slidably receives the rod portion 56 of the piston 52. An O-ring 80 in an annular groove in the aperture 78 forms a seal with the rod portion 58, and an O-ring 82 in an annular groove in the aperture 79 forms a seal between the end wall 74 and the rod portion 56. An O-ring 84 is also provided in an annular groove about a sidewall 52c of the piston 52, forming a seal between the piston 52 and cylinder 54. An annular groove 86 in the sidewall 72b of the movable cylinder 54 receives the ends of the longer arms 42b of the lever arms 42, so that movement of the cylinder 54 in an axial direction rocks the lever arms 42 about the axis of the lever pins 44 and exerts a radial force on the master jaws 20. As best shown in FIGS. 3 and 4, the lever arms 42 extend generally in the same radial plane as the fluid motor and the axial extent of the cylinder changer lies between outer surfaces 21 of the master jaws and the back of the lever arms, thereby minimizing the axial length requirements of the jaw operating mechanism.

Separate passageways 90, 92, as shown in FIGS. 2, 3 and 4 supply fluid under pressure from side ports 91, 93, respectively, to opposite sides of the fixed piston 52. The passageway 90 is shown in detail in FIG. 3 and the passageway 92 is shown in detail in FIG. 4. The passageway 90 includes a portion 90a directed inwardly from the periphery of the chuck body, a distance sufficient to underlie at its inner end the part of the cover plate 64 received in the recess 66 in the front face of the chuck body. A forwardly or upwardly extending portion 90b of the passageway 90 extends between the inner end of the passageway portion 90a and the recess 66. An O-ring 94 is received in a counterbored portion of the passageway 90b at the recess 66 and effects a seal with the cover plate 64. The cover plate 64 has an aperture 90c that overlies the open end of passageway portion 90b and that communicates with a radial bore 90d also forming a part of the passageway 90. The inner end of the radial bore 90d terminates over the end of the piston rod portion 56 and communicates with the central recess 68 of the cover plate through an axial passageway 90e. The passageway 90e is counterbored at the surface of the recess 68 and receives an O-ring 96 to form a seal between the cover plate 64 and the end of the piston rod portion 56. An axial bore 90f extends within the piston rod portion 56 in alignment with the passageway portion 90e and terminates in the general plane of the piston 52. An angular bore 90g extends from the upper side of the piston 52, in the orientation of FIG. 3, inwardly to the passageway portion 90f and completes the passageway 90.

It will be seen from FIG. 4 that the passageway 92, extending from a port 93 to the interior of the cylinder 54, includes portions 92a, b, c, d, e, f and O-rings 100, 102 constructed in the same manner as their counterparts described in connection with the passageway 90. The passageway 92 terminates in an angular bore 92g that extends downward in the orientation of FIG. 4 and communicates with the interior of the cylinder 54 on the opposite side of the piston 52 from the passageway 90g. It will be apparent from this construction, that fluid supplied through one of the passageways 90 or 92 and exhausted through the other passageway, will cause the cylinder 54 to move to a forward or upper position as shown in FIG. 3 or a rearward or downward position as shown in FIG. 4. The substantial area of the piston 52, assured by the relatively large diameter of the piston and cylinder and the relatively small diameter of the projections 56, 58, provides a substantial actuating force tending to move the cylinder axially of the chuck body to operate the jaw levers 42. In turn, the levers multiply the force of the cylinder by virtue of the longer arms 42b acted on by the cylinder 54 and the shorter arms 42a that act on the jaws. Rearward or downward movement of the cylinder 54 rocks the levers 42 in a direction that tends to move the master jaws 20 inward toward the central axis of the chuck body, in work gripping and holding position, as shown in FIG. 4. Movement of the cylinder in the opposite direction rocks the levers in a direction that tends to move the master jaws outward, to the position shown in FIG. 3, to release or receive a workpiece.

As will be apparent from the drawings, the cover plate 64 serves as a stop or support for a workpiece W gripped by the jaws 22. The construction of the fluid motor 50 adds to the rigidity of the cover plate 64 in that the fixed piston 52, with oppositely extending rod portions 56, 58 serves as a center post between the backplate 36 and the cover plate 64. This, of course, increases the strength of the chuck and the accuracy that can be obtained when the chuck is used.

From the above description, it will be appreciated that a low profile, compact chuck of high strength and rigidity has been provided having a fluid motor with a piston and cylinder of large operating area and therefore relatively high chucking power. The actuating fluid motor is located entirely within the chuck body so that the chuck can be mounted on tables or other machine tool parts that preclude operation through the baseplate of the chuck. The lever arms are interconnected directly with the external cylinder wall and are located radially of the cylinder and piston, to provide axial compactness. With the construction shown, the fluid motor essentially requires only the axial depth otherwise necessitated by the master jaws and actuating levers.

While a preferred embodiment of this invention has been described with particularity, it will be understood that numerous modifications or alterations may be made therein without departing from the spirit and scope of the invention.

What is claimed is:

1. A chuck comprising: a body having a first face adapted to be received against a support and a second face spaced therefrom and disposed generally parallel thereto, a plurality of jaws carried by the body adjacent said second face for movement toward and away from a generally central part of the body, a central cavity in the body, a jaw actuating fluid motor contained entirely within the central cavity between said two faces, said motor including a piston fixed relative to the chuck body and having two oppositely directed working surfaces, and a cylinder about the piston slidable only within the body between said faces relative to the piston, and jaw actuating linkages within the body, operatively associated with said cylinder and jaws, for transmitting movement and force from the cylinder to the jaws.

2. A chuck comprising: a body, a plurality of jaws carried by the body for movement toward and away from a generally central axis of the body, a central cavity in the body, a backplate and a cover plate at opposite ends of said central cavity secured to the chuck body, said cover plate being located at a front face of the chuck body adjacent the chuck jaws and adapted to abut a workpiece held by the chuck, a jaw actuating fluid motor within the central cavity, said motor including a piston fixed relative to the chuck body and a cylinder about the piston slidable axially of the body relative to the piston, said fixed piston including portions extending between said backplate and said cover plate centrally of the cover plate, and jaw actuating linkages within the body, operatively associated with said cylinder and jaws, for transmitting movement and force from the cylinder to the jaws.

3. A chuck as set forth in claim 2 wherein the linkages include pivotally supported levers, one associated with each jaw, and each including an arm engaged with said cylinder so that reciprocal movement of said cylinder rocks said levers.

4. A chuck as set forth in claim 3 wherein said levers are located radially outward from said cylinder and at a generally common axial distance with said cylinder from said cover plate.

5. A chuck as set forth in claim 4 wherein fluid passageways to said cylinder extend in part through the chuck body, in part through the cover plate, and in part through the piston.

6. A chuck comprising: a body; a plurality of jaws carried by the body, supported for movement toward and away from a common reference axis; a cavity in the body at said reference axis; a backplate and a cover plate secured to said body at opposite ends of said cavity, said cover plate located at a front face of the body adjacent said jaws and adapted to abut a workpiece held by the chuck; a jaw actuating fluid motor within said central cavity, said fluid motor having a piston fixed relative to said body with rod portions extending in opposite directions and secured to said cover plate and backplate, and having a cylinder surrounding said piston, movable axially within said central cavity; fluid supply and exhaust conduits within the chuck communicating to the cylinder; and a plurality of jaw actuating levers pivotally supported within said body, each operatively connected to said jaws and to said cylinder so that axial movement of the cylinder moves the jaws toward or away from said axis, said levers being disposed generally radially from the cylinder and in the general radial plane of the fluid motor; whereby an axially compact chuck of substantial strength and rigidity is provided.

7. A chuck as set forth in claim 6 wherein fluid passageways to said cylinder extend in part through the chuck body, in part through the cover plate, and in part through the piston.

8. A chuck comprising: a body; a plurality of master jaws carried by said body, supported for movement toward and away from a common central axis, each master jaw having an outer surface adapted to carry a work gripping jaw; a plurality of jaw actuating lever arms supported in said body, one behind each master jaw and connected to an inner portion thereof; a fluid motor within said body at said central axis, said fluid motor having a piston fixed relative to the body and a cylinder surrounding the piston, movable axially within the body, and forming fluid chambers on opposite sides of said piston, the axial extent of said fluid chambers lying between the said outer surfaces of said master jaws and surfaces of said lever arms most remote from said outer surfaces; fluid supply and exhaust conduits within the body communicating to the cylinder on opposite sides, axially, of the piston; and means associated with the cylinder for transmitting movement and force from said cylinder to said lever arms to actuate said master jaws.

9. A chuck as set forth in claim 8 wherein said piston is annular and is supported by central rodlike projections from opposite sides that extend along the body central axis; and wherein said cylinder has central openings at opposite ends through which said projections extend and has recessed portions in the outer surface of the cylinder-forming wall that receive end portions of said lever arm.

10. A chuck as set forth in claim 1 including a peripheral surface about said body and fluid passageways to said fluid motor extending through said peripheral surface at locations between said first and second faces.

11. A chuck body comprising: a body having a peripheral surface, a first face adapted to be received against a support, and a second face spaced therefrom and disposed generally parallel thereto; a plurality of jaws carried by the body adjacent said second face for movement toward and away from a generally central part of the body; a central cavity in the body; a jaw actuating fluid motor contained entirely within the central cavity between said two faces, said motor including a piston fixed relative to the chuck body and a cylinder about the piston slidable only within the body between said faces relative to the piston; fluid passageways to said fluid motor extending through said peripheral surface of the body at locations between said first and second faces, said fluid passageways including one passageway that opens into the cylinder on one side of the piston and another that opens into the cylinder on the opposite side of said piston; and jaw actuating linkages within the body, operatively associated with said cylinder and jaws, for transmitting movement and force from the cylinder to the jaws.